(12) United States Patent
Ito

(10) Patent No.: US 11,088,858 B2
(45) Date of Patent: Aug. 10, 2021

(54) COMMUNICATION SYSTEM AND COMMUNICATION APPARATUS CONTROLLING A SWITCHING HUB FOR POWER

(71) Applicant: CANON KABUSHIKI KAISHA, Tokyo (JP)

(72) Inventor: Hiroki Ito, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/817,053

(22) Filed: Nov. 17, 2017

(65) Prior Publication Data

US 2018/0097642 A1    Apr. 5, 2018

Related U.S. Application Data

(63) Continuation of application No. 13/298,016, filed on Nov. 16, 2011, now Pat. No. 9,853,821, which is a continuation of application No. 12/465,231, filed on May 13, 2009, now Pat. No. 8,081,638.

(30) Foreign Application Priority Data

May 13, 2008   (JP) ................................. 2008-125876

(51) Int. Cl.
  *H04L 12/12*    (2006.01)
  *H04L 12/24*    (2006.01)
(52) U.S. Cl.
  CPC .......... *H04L 12/12* (2013.01); *H04L 41/0803* (2013.01); *H04L 41/0813* (2013.01); *H04L 41/0833* (2013.01); *Y02D 30/50* (2020.08)

(58) Field of Classification Search
CPC combination set(s) only.
See application file for complete search history.

(56) References Cited

U.S. PATENT DOCUMENTS

| | | | |
|---|---|---|---|
| 6,335,812 B1 * | 1/2002 | Matsubara | H04B 10/1149 398/115 |
| 6,542,471 B1 * | 4/2003 | Ito | H04B 1/707 370/252 |
| 7,890,784 B2 * | 2/2011 | Katoh | B41J 29/393 713/300 |

(Continued)

FOREIGN PATENT DOCUMENTS

| | | |
|---|---|---|
| JP | 2001-154763 A | 6/2001 |
| JP | 2007-276341 A | 10/2007 |

*Primary Examiner* — Edan Orgad
*Assistant Examiner* — Emmanuel K Maglo
(74) *Attorney, Agent, or Firm* — Canon U.S.A., Inc. IP Division

(57) ABSTRACT

A CPU of an image forming apparatus controls, according to establishment of a sleep change condition, a MAC/PHY in a network unit to change the image forming apparatus from a link-up state to a link-down state. The CPU controls the image forming apparatus to change from a normal mode to a deep sleep mode. A CPU of the network unit controls, according to the change of the image forming apparatus from the normal mode to the deep sleep mode, the MAC/PHY to change the link-down state of the image forming apparatus to the link-up state. The CPU controls the MAC/PHY to transmit a MAC address necessary for causing the image forming apparatus to participate in VLAN to a switching hub.

6 Claims, 11 Drawing Sheets

(56) References Cited

U.S. PATENT DOCUMENTS

| | | | |
|---|---|---|---|
| 8,214,676 B2* | 7/2012 | Katoh | G03G 15/5004 713/324 |
| 2002/0075529 A1* | 6/2002 | Sato | H04N 1/00236 358/505 |
| 2002/0107961 A1* | 8/2002 | Kinoshita | H04L 63/0272 709/225 |
| 2003/0025930 A1* | 2/2003 | Tateyama | G06F 13/4291 358/1.14 |
| 2004/0010325 A1* | 1/2004 | Naitoh | G06Q 10/087 700/65 |
| 2004/0057069 A1* | 3/2004 | Ikeda | G06F 1/3203 358/1.14 |
| 2005/0076129 A1* | 4/2005 | Coffey | H04L 43/50 709/228 |
| 2005/0089037 A1* | 4/2005 | Kojima | H04L 49/3054 370/394 |
| 2005/0144237 A1* | 6/2005 | Heredia | G06F 8/60 709/206 |
| 2005/0198428 A1* | 9/2005 | Ikeda | G06F 13/28 710/313 |
| 2006/0212730 A1* | 9/2006 | Senda | G06F 1/32 713/300 |
| 2006/0274368 A1* | 12/2006 | Imine | G06K 15/00 358/1.15 |
| 2007/0240004 A1* | 10/2007 | Maeda | G06F 1/266 713/322 |
| 2008/0123641 A1* | 5/2008 | Park | G06F 3/1209 370/389 |
| 2008/0195688 A1 | 8/2008 | Watanabe | |
| 2008/0298528 A1* | 12/2008 | Fukushima | G06F 1/3203 375/362 |
| 2009/0010671 A1* | 1/2009 | Hashimoto | G03G 15/5004 399/88 |
| 2009/0093264 A1* | 4/2009 | Heredia | H04L 51/04 455/466 |
| 2009/0119522 A1* | 5/2009 | Satoh | G06F 1/3209 713/320 |
| 2009/0119525 A1* | 5/2009 | Morimoto | B41J 29/393 713/323 |
| 2009/0125739 A1* | 5/2009 | Satoh | G06F 1/3209 713/322 |
| 2009/0164816 A1* | 6/2009 | Yasuda | B41J 29/393 713/320 |
| 2009/0204829 A1* | 8/2009 | Fukuda | G06F 1/32 713/321 |
| 2009/0282278 A1* | 11/2009 | Satoh | G06F 1/3209 713/321 |
| 2009/0284790 A1* | 11/2009 | Ohashi | G06F 21/35 358/1.15 |
| 2010/0119236 A1* | 5/2010 | Uno | H04B 10/801 398/141 |
| 2010/0142426 A1* | 6/2010 | Taniuchi | H04W 52/028 370/311 |
| 2010/0218023 A1* | 8/2010 | Yokoyama | G06F 1/3203 713/323 |
| 2010/0251342 A1* | 9/2010 | Uchikawa | G06F 21/81 726/4 |

* cited by examiner

FIG. 6

| MAC ADDRESS | VLAN NUMBER | VLAN PARTICIPATION STATE |
|---|---|---|
| 000085000001 | VLAN 1 | NOT PARTICIPATE |
| 000085000002 | VLAN 2 | PARTICIPATE |
| 000085000003 | VLAN 1 | PARTICIPATE |

FIG. 10

| IP ADDRESS | VLAN NUMBER | VLAN PARTICIPATION STATE |
|---|---|---|
| 192.168.10.1 | VLAN 1 | NOT PARTICIPATE |
| 192.168.11.1 | VLAN 2 | PARTICIPATE |
| 192.168.12.1 | VLAN 1 | PARTICIPATE |

FIG. 11

| USER-ID | VLAN NUMBER | VLAN PARTICIPATION STATE |
|---|---|---|
| USER-A | VLAN 1 | NOT PARTICIPATE |
| USER-B | VLAN 2 | PARTICIPATE |
| USER-C | VLAN 1 | PARTICIPATE |

COMMUNICATION SYSTEM AND COMMUNICATION APPARATUS CONTROLLING A SWITCHING HUB FOR POWER

CROSS REFERENCE TO RELATED APPLICATIONS

The present application is a Continuation of U.S. patent application Ser. No. 13/298,016 filed Nov. 16, 2011, now U.S. Pat. No. 9,853,821 B2, and is a Continuation of U.S. patent application Ser. No. 12/465,231 filed May 13, 2009, now U.S. Pat. No. 8,081,638 B2, which claims priority from Japanese Patent Application No. 2008-125876 filed May 13, 2008, the entire contents of each of which are hereby incorporated by reference.

BACKGROUND OF THE INVENTION

Field of the Invention

The present invention relates to a communication system and a communication apparatus.

Description of the Related Art

A network interface card (NIC) has conventionally been used for enabling a communication apparatus to communicate with other communication apparatuses via a network such as a local area network (LAN).

Ethernet® is popular as a representative network standard. A NIC compliant with the Ethernet® standard can perform communication by selecting one of a plurality of communication speeds of 10 Mbps, 100 Mbps, and 1000 Mbps.

Power saving has been required of the communication apparatus. In this regard, for example, Japanese Patent Application Laid-Open No. 2001-154763 discusses a technique for saving power by reducing a communication speed of the NIC when the communication apparatus operates in a power-saving mode.

To achieve more power saving, Japanese Patent Application Laid-Open No. 2007-276341 discusses a technique for cutting off power supplied to a part of the communication apparatus when the communication apparatus operates in the power-saving mode.

As a recent network related technique, a virtual local area network (VLAN) has been popular. This VLAN technique virtually divides a plurality of computer terminals physically connected to a network using a network device such as a switching hub into a plurality of groups (virtual network) to manage the groups as they belong to different LANs.

The VLAN technique includes a dynamic VLAN technique. In the dynamic VLAN technique, the switching hub virtually divides a plurality of computer terminals into a plurality of groups to manage them based on information (e.g., media access control (MAC) address) obtained from each of the plurality of computer terminals connected to the switching hub.

Consideration will be given to a case where a communication link with the switching hub is cut off in the communication apparatus connected to the switching hub compliant with the dynamic VLAN technique. In this case, to reconnect (link-up) the communication link with the switching hub, the communication apparatus has to transmit information such as a MAC address again to the switching hub.

It is because the switching hub compliant with the dynamic VLAN technique has determined that the computer terminal having its communication link cut off no longer belongs to (participates in) the VLAN when the cutting-off of the communication link is performed. To participate in the VLAN configured by the switching hub, the communication apparatus has to transmit information such as a MAC address to the switching hub.

In this regard, Japanese Patent Application Laid-Open Nos. 2001-154763 and 2007-276341 give no discussion about the dynamic VLAN technique. Thus, the techniques discussed in these two documents cannot simultaneously achieve power saving of the communication apparatus and complying with the dynamic VLAN.

SUMMARY OF THE INVENTION

The present invention is directed to secure transmission of information necessary for a communication apparatus to participate in a virtual network while achieving power saving of the communication apparatus.

According to an aspect of the present invention, a communication system includes a switching hub capable of configuring a virtual network, and a communication apparatus connected to a network via the switching hub. The switching hub includes a first packet processing unit configured to transfer packet data with the communication apparatus, a storage unit configured to store identification information for identifying a terminal permitted to participate in the virtual network, and a management unit configured to manage, if information received by the first packet processing unit from the communication apparatus matches the identification information stored in the storage unit, the communication apparatus to participate in the virtual network corresponding to the matched identification information. The communication apparatus includes a second packet processing unit configured to transfer the packet data with the switching hub, a first control unit configured to control the communication apparatus, a second control unit configured to control the second processing unit, a power supply unit configured to supply power in one of a normal mode for supplying power to the first control unit, the second control unit, and the second packet processing unit and a power-saving mode for reducing power supplied to the first control unit lower than power in the normal mode while supplying power to the second control unit and the second packet processing unit, and a first determination unit configured to determine whether a switching condition for switching from the normal mode to the power-saving mode has been established. The first control unit controls, according to the determination of the determination unit that the switching condition has been established, the second packet processing unit to change from a link-up state where a communication link is established with the switching hub to a link-down state where the communication link is not established, and the power supply unit to change from the normal mode to the power-saving mode. The second control unit controls, according to the change from the normal mode to the power-saving mode, the second packet processing unit to change the link-down state to the link-up state and to transmit information needed by the switching hub to cause the communication apparatus to participate in the virtual network to the switching hub. The second packet processing unit sets a communication speed between the communication apparatus and the switching hub when the power supply unit operates in the power-saving mode lower than a communication speed between the communication apparatus and the switching hub when the power supply unit operates in the normal mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates a VLAN database in a MAC based VLAN.

FIG. 10 illustrates a VLAN database in a subnet based VLAN.

FIG. 11 illustrates a VLAN database in a user based VLAN.

DETAILED DESCRIPTION OF THE EMBODIMENTS

Figure 1:
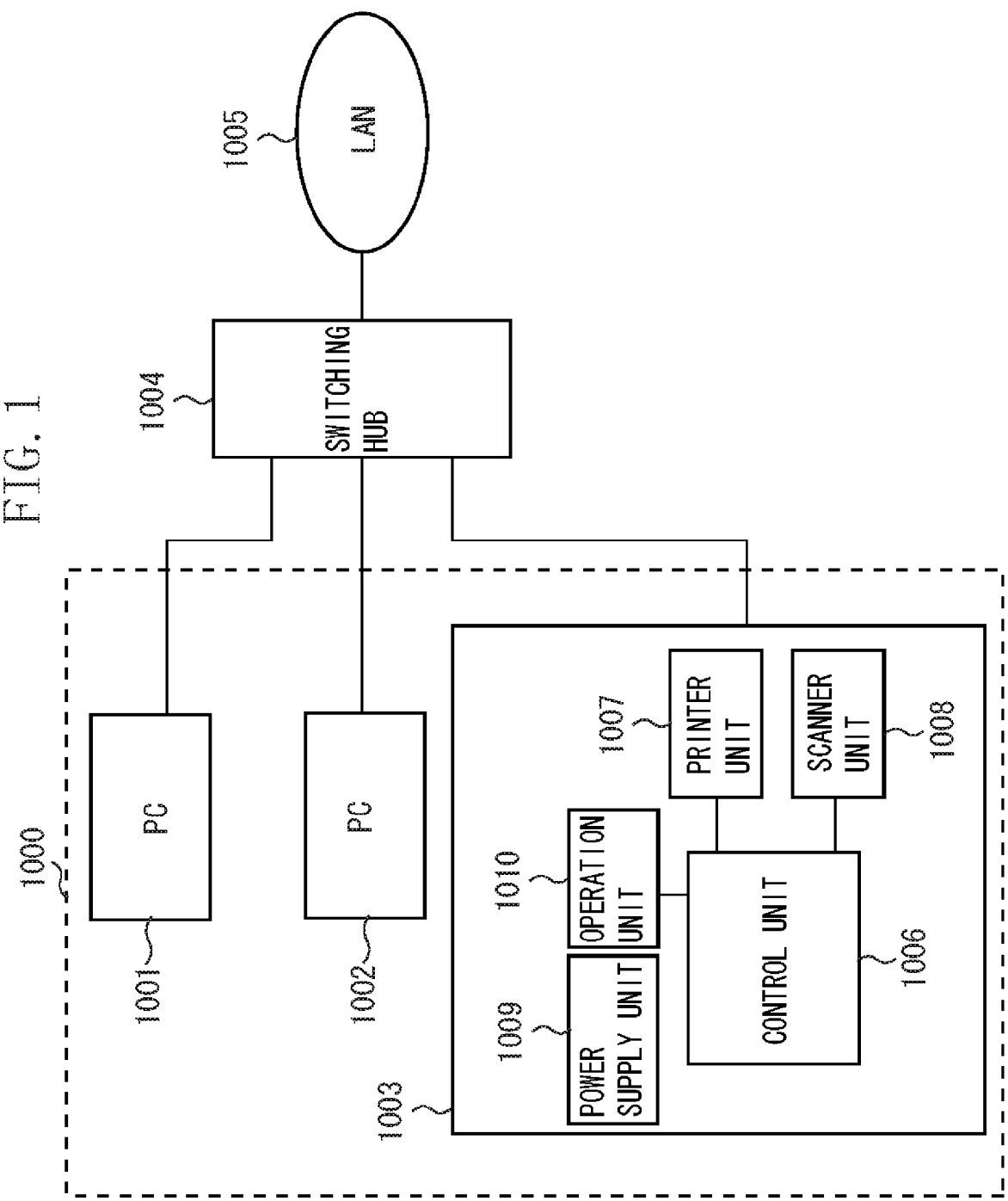
FIG. 1 is a block diagram illustrating a configuration of a communication system.

Various exemplary embodiments, features, and aspects of the invention will be described in detail below with reference to the drawings.

In the drawings, elements and parts which are identical throughout the exemplary embodiments are designated by identical reference numerals, and duplicate description thereof is omitted.

Referring to the drawings, the exemplary embodiments of the present invention will be described. Components of the exemplary embodiments are only examples, not limiting a scope of the present invention.

FIG. 1 is a block diagram illustrating a configuration of a communication system which includes a communication apparatus according to a first exemplary embodiment of the present invention.

In FIG. 1, a communication system 1000 includes an image forming apparatus 1003 having an image output function, and personal computers (PCs) 1001 and 1002 as computer terminals. These components are connected to a local area network (LAN) 1005 via a switching hub 1004.

The image forming apparatus 1003 includes an operation unit 1010 for allowing a user to perform various operations, a scanner unit 1008 for reading image information according to an instruction from the operation unit 1010, and a printer unit 1007 for printing image data on a sheet. The image forming apparatus 1003 further includes a control unit 1006 for controlling the scanner unit 1008 and the printer unit 1007 based on instructions from the operation unit 1010 and the PC 1002. Further, the image forming apparatus 1003 includes a power supply unit 1009 for supplying power to the image forming apparatus 1003.

The PCs 1001 and 1002 can transmit print jobs each containing one page or a plurality of pages of image data to the image forming apparatus 1003 via the LAN 1005. The PCs 1001 and 1002 can transmit, in addition to the print jobs, various commands to the image forming apparatus 1003. The PCs 1001 and 1002 can transmit the print jobs to not only the image forming apparatus 1003 but also other image forming apparatuses connected to the LAN 1005.

Figure 2:
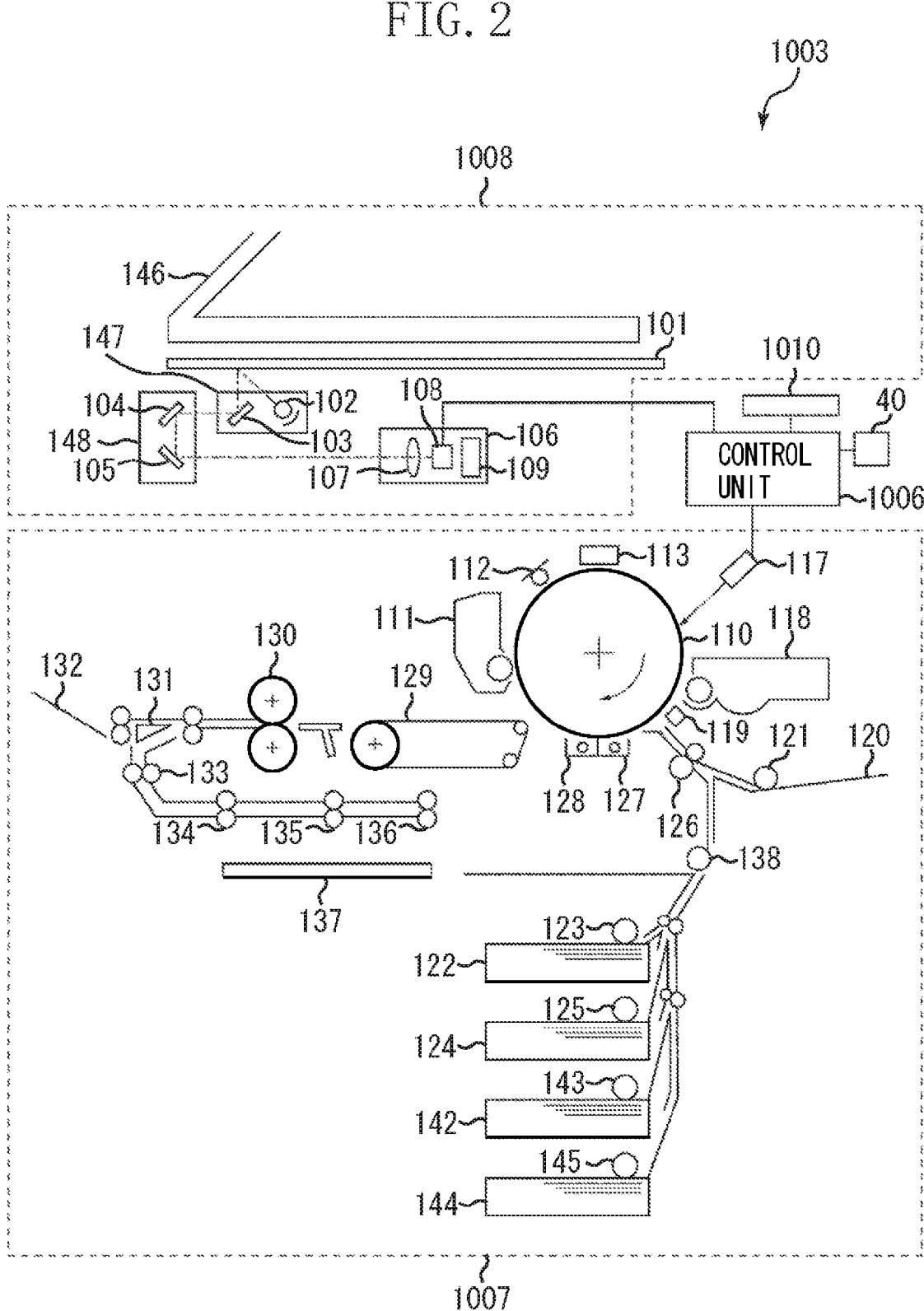
FIG. 2 is a block diagram illustrating a configuration of an image forming apparatus.

FIG. 2 is a block diagram illustrating a configuration of the image forming apparatus 1003 illustrated in FIG. 1.

In FIG. 2, the scanner unit 1008 includes a platen glass 101 for placing a document, an automatic document feeder 142 for sequentially feeding documents to a predetermined position of the platen glass 101. The scanner unit 1008 scans to expose the documents placed on the platen glass 101 in a main scanning direction. The scanner unit 1008 includes a document illumination lamp 102, a scanning mirror 103, a scanning unit 147 installed below the platen glass 101, and scanning mirrors 104 and 105 for reflecting a reflected light from the scanning mirror 103 toward a charge coupled device (CCD) unit 106.

The scanner unit 1008 further includes a scanning unit 148 for performing scanning in a sub-scanning direction at half the speed of the scanning unit 147, and an imaging lens 107 for receiving the reflected light from the scanning mirror 105 to form an image. The scanner unit 1008 includes the CCD unit 106 including an imaging sensor 108 constituted of a CCD for converting the formed image into, for example, an 8-bit digital image signal, and a CCD driver 109 for driving the imaging sensor 108.

The control unit 1006 receives an instruction from the operation unit 1010, generates image data based on an image signal output from the imaging sensor 108, and controls the entire apparatus. The control unit 1006 will be described below in detail referring to FIG. 3.

The printer unit 1007 exposes, based on image data generated by the control unit 1006, the photosensitive drum 110 to form an electrostatic latent image. For example, the printer unit 1007 includes an exposure unit 117 including a semiconductor laser, and a developing device 118 for containing toner (i.e., black developer) and developing the electrostatic latent image on the photosensitive drum 110 by the toner. The printer unit 1007 includes a pre-transfer charger 119 for applying a high voltage to the toner image developed on the photosensitive drum 110 before transfer.

The printer unit 1007 includes a manual paper feeding unit 120, and paper feeding units 122, 124, 142, and 144 for storing sheets. The printer unit 1007 includes feed rollers 121, 123, 125, 143, and 145 for feeding sheets on the manual paper feeding unit 120 or sheets stored in the paper feeding units 122, 124, 142, and 144. The printer unit 1007 includes a registration roller 126 for feeding the sheets fed from the feed rollers 121, 123, 125, 143 and 145 to the photosensitive drum 110.

The feed rollers 121, 123, 135, 143, and 145 temporarily stop the sheets on the manual feeding unit 120 or the sheets stored in the paper feeding units 122, 124, 142, and 144 in a position of the registration roller 126. Then, the feed rollers feed the sheets by taking write timing with the toner image developed on the photosensitive drum 110.

The printer unit 1007 further includes a transfer charger 127 for transferring the toner image developed on the photosensitive drum 110 to the fed sheet, and a separation charger 128 for separating, from the photosensitive drum 110, the sheet to which the toner image has been transferred from the photosensitive drum 110.

The printer unit 1007 includes a conveyor belt 129 for conveying the separated sheet to a fixing device 130, and a cleaner 11 for removing toner left on the photosensitive drum 110. The printer unit 1007 includes a pre-exposure lamp 112 for discharging the photosensitive drum 110, and a primary charging unit 113 for uniformly charging the photosensitive drum 110.

The printer unit 1007 includes the fixing device 130 for fixing the toner image on the sheet to which the toner image has been transferred, and a sorter 132 for receiving the sheet on which a toner image is fixed via a flapper 131. The printer unit 1007 includes an intermediate tray 137 for receiving the sheet on which a toner image is fixed via the flapper 131 and feed rollers 133 to 136.

The printer unit 1007 includes a re-feed roller 138 for feeding the sheet of the intermediate tray 137 to the photosensitive drum 110 again. The flapper 131 is configured to switch a feeding destination of the toner image-fixed sheet between the sorter 132 and the intermediate tray 137. The rollers 133 to 136 are configured not to invert (i.e., multiple printing) or invert (i.e., two-sided printing) the toner image-fixed sheet.

Figure 3:
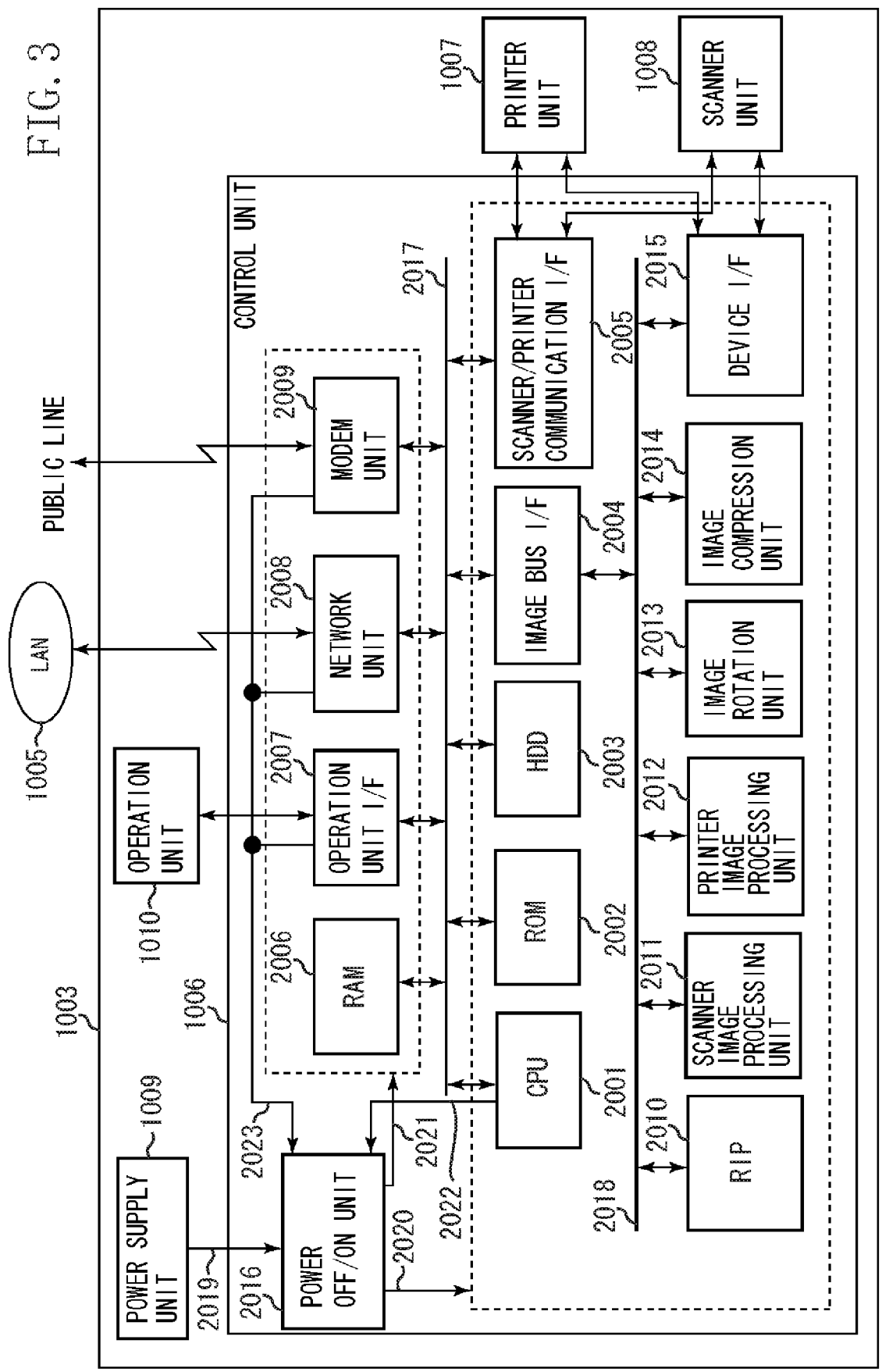
FIG. 3 is a block diagram illustrating a configuration of a control unit.

FIG. 3 is a block diagram illustrating a configuration of the control unit 1006 illustrated in FIG. 2. In FIG. 3, the control unit 1006 is connected to the scanner unit 1008, the printer unit 1007, the LAN 1005, and a public line to receive/output image data or device information.

The control unit 1006 includes a raster image processor (RIP) 2010 for rasterizing, in a bitmap image, a page description language (PDL) code included in a print job received from a computer terminal on the LAN via the LAN 1005. The control unit 1006 includes a scanner image processing unit 2011 for correcting, processing or editing image data entered from the scanner unit 1008. The control unit 1006 includes a printer image processing unit 2012 for correcting or changing the resolution of the image data output (printed) from the printer unit 1007, and an image rotation unit 2013 for rotating the image data.

The control unit 1006 includes an image compression unit 2014 for compressing/decompressing multivalued image data in Joint Photographic Expert group (JPEG) format and binary image data in Joint Bi-level Image experts Group (JBIG) format, Modified Modified READ (MMR) format or Modified Huffman (MH) format. The control unit 1006 includes a device interface (I/F) 2015 for connecting the control unit 1006 to the scanner unit 1008 and the printer unit 1007 to perform synchronous/asynchronous conversion of image data. The control unit 1006 includes an image bus 2018 for interconnecting these components to transfer image data to each other at a high speed.

The control unit 1006 includes a CPU 2001 serving as a control unit (first control unit) for controlling the image forming apparatus 1003. The control unit 1006 includes a random access memory (RAM) 2006 serving as a system work memory for operating the CPU 2001 and also serving as an image memory for temporarily storing image data. The control unit 1006 outputs via an interface unit for the operation unit 1010, image data to the operation unit 1010 to be displayed. The control unit 1006 includes an operation unit I/F 2007 which transmits information entered by a user of the communication system to the CPU 2001.

The control unit 1006 includes a network unit 2008 connected to the LAN 1005 via the switching hub 1004 to communicate (transmit/receive) with the PC 1002 or a computer terminal (e.g., PC 1001) on the LAN 1005. The control unit 1006 includes a modem unit 2009 connected to the public line to communicate (transmit/receive) data with an external facsimile apparatus. The network unit 2008 receives data from the computer terminals on the LAN 1005, and processes the received data.

The control unit 1006 includes a read-only memory (ROM) 2002 for storing a boot program executed by the CPU 2001, and a hard disk drive (HDD) 2003 for storing system software, image data or a software counter value. The control unit 1006 includes a scanner/printer communication I/F 2005 for communication with CPUs of the scanner unit 1008 and the printer unit 1007, and a system bus 2017 for interconnecting these components.

The control unit 1006 includes an image bus I/F 2004 serving as a bus bridge for interconnecting the system bus 2017 and the image bus 2018 to convert a data structure. The control unit 1006 includes a power ON/OFF unit 2016 for supplying DC power received from the power supply unit 1009 via a power supply line 2019 to predetermined circuit elements of the control unit 1006 via power supply lines 2020 and 2021.

The power ON/OFF unit 2016 is controlled according to a control signal received from the network unit 2008 via a control signal line 2023 and a control signal received from the CPU 2001 via a control signal line 2022. The power ON/OFF unit 2016 selectively turns ON/OFF the power supply lines 2020 and 2021. The power supply line 2020 is connected to the CPU 2001, the ROM 2002, the HDD 2003, the image bus I/F 2004, and the scanner/printer communication I/F 2005.

The power supply line 2020 is connected to the device I/F 2015, the image rotation unit 2013, the image compression unit 2014, the RIP 2010, the scanner image processing unit 2011, and the printer image processing unit 2012. The power supply line 2021 is connected to the RAM 2006, the operation unit I/F 2007, the network unit 2008, and the modem unit 2009.

The image forming apparatus 1003 illustrated in FIG. 1 performs printing processing as follows based on a print job transmitted from the computer terminal connected to the LAN 1005. The CPU 2001 stores in the RAM 2006 print data (image data) received from the computer terminal connected to the LAN 1005 via the network unit 2008. Then, the CPU 2001 supplies the image data to the RIP 2010 via the image bus I/F 2004. The RIP 2010 expands the image data (PDL code) in bitmap data. The image compression unit 2014 compresses the image data to store it in the HDD 2003.

The image data (compressed bitmap data) stored in the HDD 2003 is supplied to the image compression unit 2014 via the image bus I/F 2004. The image compression unit 2014 decompresses the supplied image data (compressed bitmap data). The printer image processing unit 2012 performs correction of the printer or resolution-conversion for the image data.

The image rotation unit 2013 rotates the image data when necessary. Then, the variously processed image data is sent as print data to the printer unit 1007 via the device I/F 2015 to be printed on a sheet by the printer unit 1007.

The image forming apparatus 1003 is operable in a deep sleep mode (one of power-saving modes). In a normal mode, the power supply unit 1009 supplies power to the power ON/OFF unit 2016 via the power supply line 2019. The CPU 2001 controls the power ON/OFF unit 2016 so that each of the power supply lines 2020 and 2021 is turned ON. In this case, the power supply unit 1009 supplies power to both of the CPU 2001 and the network unit 2008.

In the deep sleep mode, the power supply unit 1009 supplies power to the power ON/OFF unit 2016 via the power supply line 2019. The CPU 2001 controls the power ON/OFF unit 2016 so that the power supply line 2020 is turned OFF while the power supply line 2021 is turned ON.

In this case, power supplied to the main circuit components including the CPU 2001 of the control unit 1006 is cut off. Thus, power consumption of the image forming apparatus 1003 can be significantly reduced.

Upon receiving data such as a print job from the computer terminal on the LAN 1005, the network unit 2008 can control the power ON/OFF unit 2016 to return to the normal mode.

In the deep sleep mode, the power supplied to the CPU 2001 is cut off. However, other arrangements may be employed. For example, the power supplied to the CPU 2001 may be reduced lower than that in the normal mode. In this case, the CPU 2001 has executable processing limited more than that in the normal mode. The limited processing includes at least processing of data received from the computer terminal of the LAN 1005 by the network unit 2008.

In the deep sleep mode, power has been supplied to the RAM 2006 from the power supply unit 1009. Thus, the RAM 2006 performs a self-refreshing operation to back up a system program.

In the above description, the network unit 2008 switches the power supply mode from the deep sleep mode to the normal mode. However, other arrangements may be employed. Specifically, not only the network unit 2008 but also the modem unit 2009 or the operation unit I/F 2007 may switch the mode from the deep sleep mode to the normal mode. The former case enables facsimile communication, which uses the public line. The latter case enables reception of an instruction from the user of the operation unit I/F 1010.

The image forming apparatus 1003 illustrated in FIG. 1 returns from the deep sleep mode to the normal mode as follows.

For example, upon receiving a print job from the PC 1002, the network unit 2008 analyzes the print job to determine whether a packet received as the print job contains a data sequence corresponding to a physical address unique to its own apparatus. Upon detecting the data sequence corresponding to the own apparatus, the network unit 2008 controls the power PN/OFF unit 2016 via the control signal line 2023 to turn the power supply line 2021 ON, and activates the CPU 2001.

The CPU 2001 determines whether the activation of the CPU 2001 is caused by a return from the deep sleep mode to the normal mode based on the power ON/OFF unit 2016. Upon determining that it is caused by a return from the deep sleep mode to the normal mode, the CPU 2001 starts a boot sequence.

In this case, the CPU 2001 uses the system program backed up by the RAM 2006 when the mode has been switched to the deep sleep mode without performing a sequence for downloading the system program from the HDD 2003 to the RAM 2006. Thus, the control unit 1006 set in the normal mode causes the printer unit 1007 to start printing in response to the print job from the computer terminal of the LAN 1005.

Figure 4:
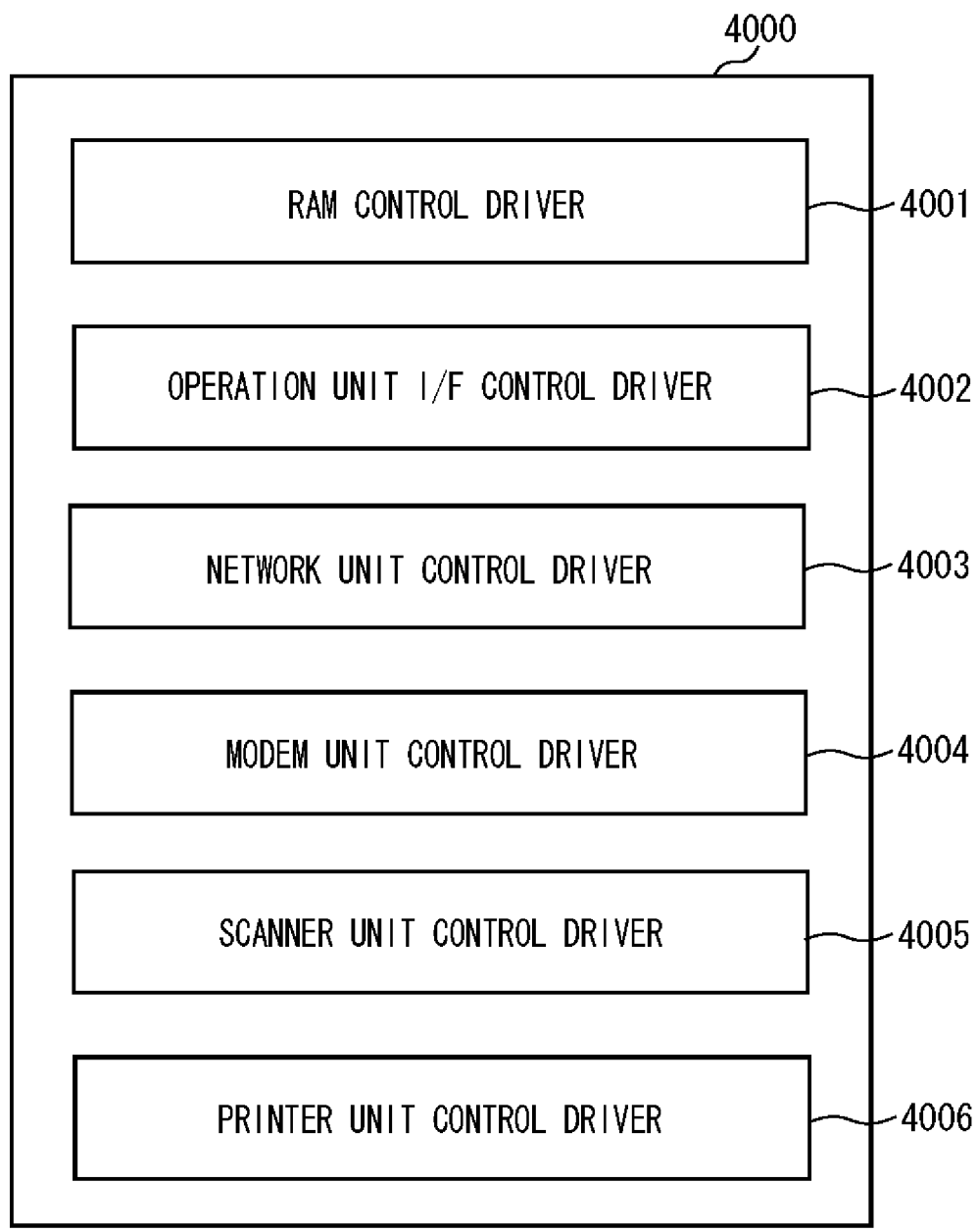
FIG. 4 illustrates a software configuration of a program executed by a central processing unit (CPU).

FIG. 4 illustrates a software configuration of a program executed by the CPU 2001. The program illustrated in FIG. 4 is stored in the HDD 2003, and the CPU 2001 executes a boot program to read the program from the HDD 2003 to the RAM 2006.

In FIG. 4, an operating system program (OS) 4000 operates as a basic program for executing various driver programs described below. A RAM control driver 4001 is a program for controlling the RAM 2006 based on an instruction from the OS 4000.

An operation unit I/F driver 4002 is a program for controlling the operation unit I/F 2007 based on an instruction from the OS 4000. A network unit control driver 4003 is a program for controlling the network unit 2008 based on an instruction of the OS 4000.

A modem unit control driver 4004 is a program for controlling the modem unit 2009 based on an instruction from the OS 4000. A scanner unit control driver 4005 is a program for controlling the scanner unit 1008 based on an instruction from the OS 4000. A printer unit control driver 4006 is a program for controlling the printer unit 1007 based on an instruction from the OS 4000.

The CPU 2001 executes the OS 4000 read in the RAM 2006 to control the units including the RAM 2006, the operation I/F 2007, the network unit 2008, the modem unit 2009, the printer unit 1007, and the scanner unit 1008. The programs 4001 to 4006 can operate in parallel on the OS 4000. The CPU 2001 executes the programs while switching the programs executed in a time-division manner so that the programs 4001 to 4006 can operate in parallel.

Figure 5:
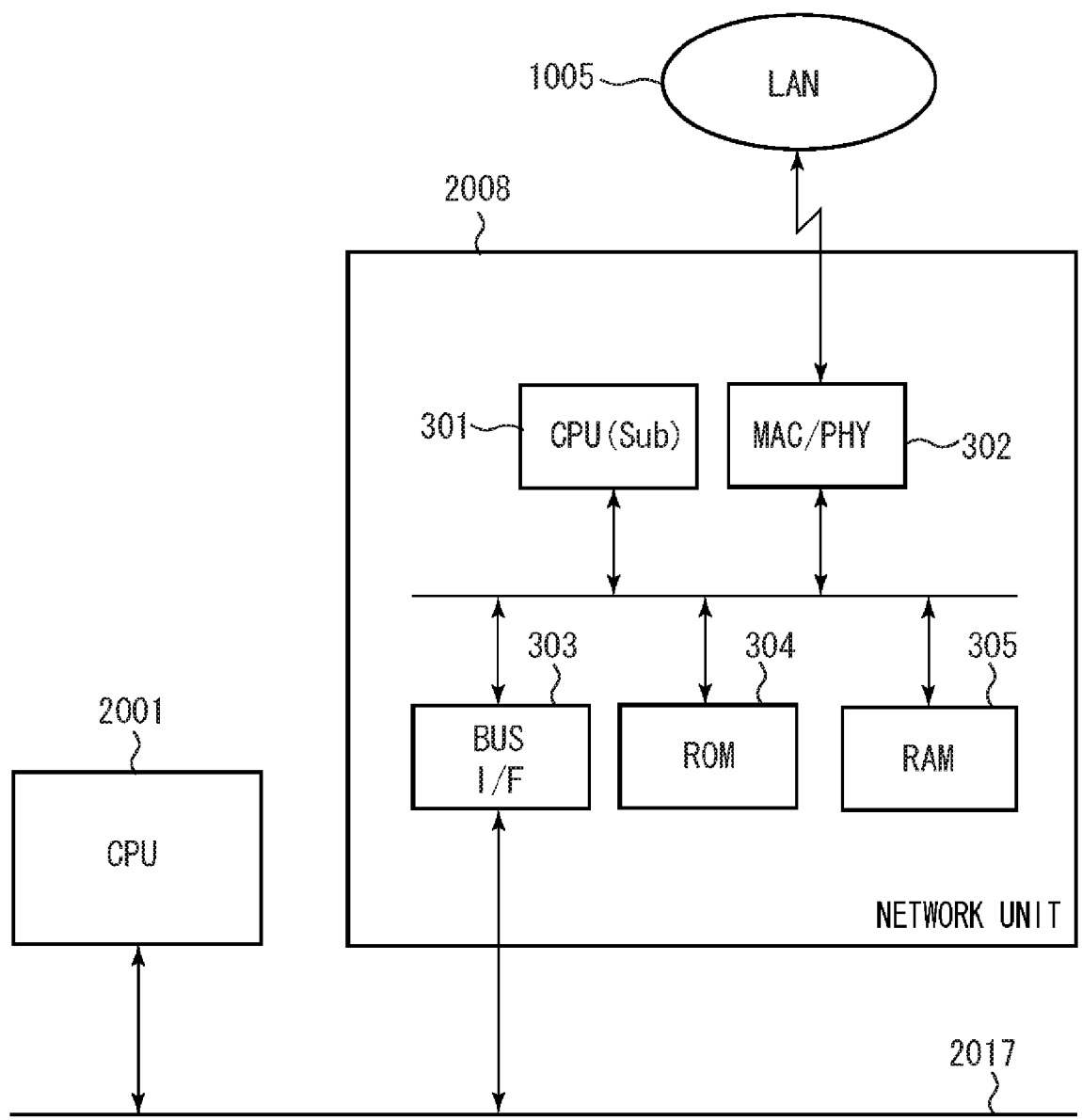
FIG. 5 is a block diagram illustrating a configuration of a network unit.

FIG. 5 is a block diagram illustrating a configuration of the network unit 2008. The network unit 2008 includes a CPU 301, a MAC/PHY 302, a bus I/F 303, a ROM 304, and a RAM 305, which are interconnected via a bus. The network unit 2008 is connected to the system bus 2017 via the switching hub 1004.

The MAC/PHY 302 functions as a second packet processing unit for transmitting/receiving packet data with the switching hub 1004. The CPU 301 functions as a second control unit for controlling the MAC/PHY 302 (the second packet processing unit).

The ROM 304 stores a wake-on-LAN pattern (WOL pattern). The CPU 301 determines, when the image forming apparatus 1003 operates in the deep sleep mode, whether a packet received by the MAC/PHY 302 via the LAN 1005 matches the WOL pattern stored in the ROM 304.

Upon determining that the packet received by the MAC/PHY 302 matches the WOL pattern, the CPU 301 instructs the power supply unit 1009 so that the power ON/OFF unit 2016 resumes power supply to the CPU 2001 via the power supply line 2020.

The ROM 302 stores a substitute response pattern. The RAM 305 stores response data corresponding to the substitute response pattern. This response data includes, for example, status information of the image forming apparatus 1003 (e.g., information indicating an operation mode of the image forming apparatus 1003 or information indicating the remaining amount of sheets).

The CPU 301 determines, when the image forming apparatus 1003 operates in the deep sleep mode, whether the packet received by the MAC/PHY 302 via the LAN 1005 matches a substitute response pattern stored in the ROM 304. Upon determining that the packet received by the MAC/PHY 302 matches the substitute response pattern, the CPU 301 reads from the RAM 305 the response data corresponding to the substitute response pattern. The CPU 301 transmits the response data read from the RAM 305 to the computer terminal on the LAN 1005, which is a transmission source of the substitute response pattern.

The CPU 301 issues no instruction to the power supply unit 1009 for causing the power ON/OFF unit 2016 to resume power supply to the CPU 2001 via the power supply line 2020 even when the CPU 301 detects the substitute response pattern. Thus, the image forming apparatus 1003 can execute response processing while maintaining the deep sleep mode without returning to the normal mode from the deep sleep mode when it receives the substitute response pattern to respond.

The network unit 2008 can execute communication complying with Ethernet (registered trademark) standard. The network unit 2008 can carry out communication in a plurality of types of communication modes, and can communicate with the switching hub 1004, for example, at one of communication speeds of 10 Mbps, 100 Mbps, and 1000 Mbps. The switching hub 1004 complies with the Ethernet standard, and can perform communication at one of speeds of 10 Mbps, 100 Mbps, and 1000 Mbps.

Figure 9:
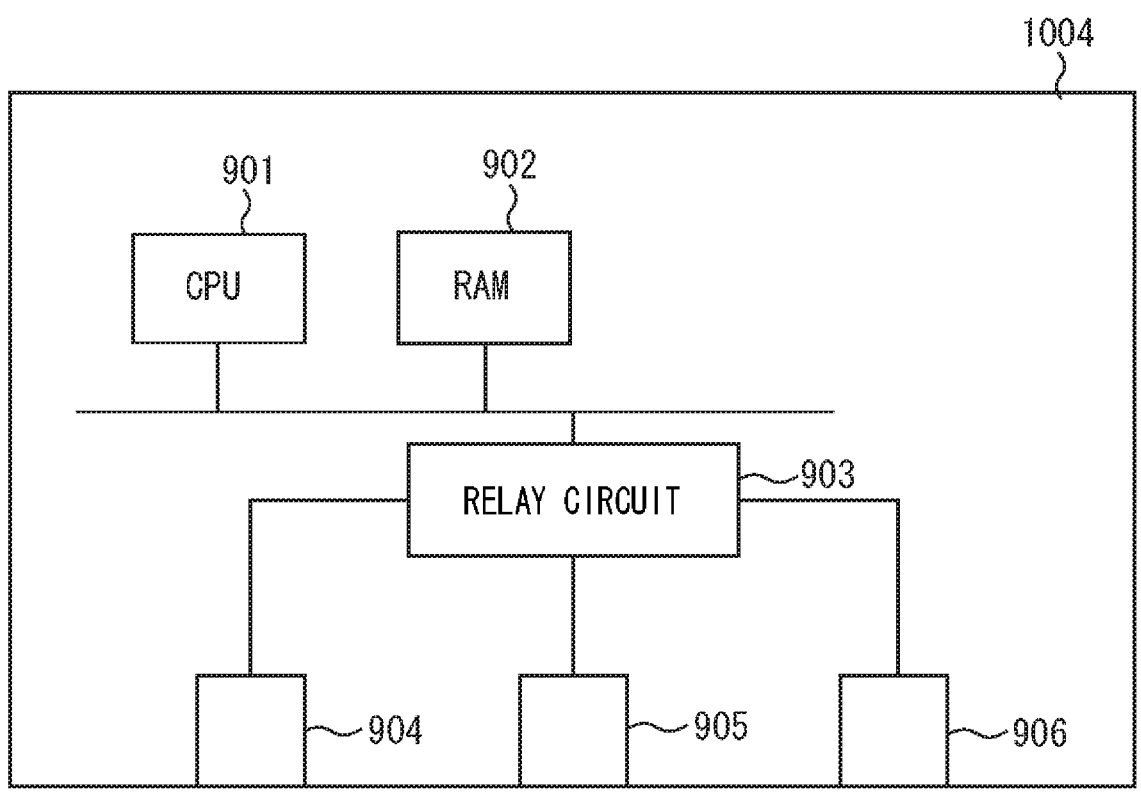
FIG. 9 is a block diagram illustrating a configuration of a switching hub.

FIG. 9 is a block diagram illustrating a configuration of the switching hub 1004. The switching hub 1004 includes three connection ports (i.e., 1st to 3rd ports 904 to 906). The switching hub 1004 includes a relay circuit 903 for relaying among the ports.

Under control of the CPU 901, the relay circuit 903 can optionally switch connection among the ports. The CPU 901 functions as a first packet processing unit for transmitting/receiving packet data via the ports 904 to 906. The RAM 902 stores a VLAN database illustrated in FIG. 6 described below. The VLAN database includes data indicating, as described below, relationship between identification information (MAC address in the exemplary embodiment) for identifying a computer terminal which can participate in a virtual network (VLAN) of the switching hub and a type of VLAN.

The CPU 901 determines whether information included in the packet data received from each port matches identification information stored in the VLAN database. Upon determining the matching, the CPU 901 manages the terminal, which has transmitted the packet data to the port, to participate in the virtual network corresponding to the matched identification information.

The switching hub 1004 is presumed to be capable of constituting a dynamic virtual local area network (VLAN). A VLAN technique virtually divides a plurality of computer terminals of a network physically connected using a network device such as a switching hub into a plurality of groups (virtual network), and manages the groups as they belong to different LANs.

The VLAN technique includes a technique for configuring a VLAN by grouping a plurality of ports of the switching hub (static VLAN technique). According to this technique, for example, the switching hub manages two terminals each connected to the 1st and 2nd ports as terminals constituting a VLAN 1, and one terminal connected to the 3rd port as a terminal constituting a VLAN 2.

The VLAN technique includes a dynamic VLAN technique. According to the dynamic VLAN technique, the switching hub virtually divides a plurality of computer terminals into a plurality of groups to manage them based on information obtained from each of the plurality of computer terminals connected to the switching hub.

For example, in the case of the MAC based VLAN technique, MAC addresses are obtained from computer terminals connected to the switching hub, and the switching hub manages to which VLAN a computer terminal with a MAC address belongs.

For example, in the case of the subnet based VLAN technique, IP addresses are obtained from computer terminals connected to the switching hub, and the switching hub manages to which VLAN a computer terminal with an IP address belongs.

For example, in the case of the user based VLAN technique, user information is obtained from computer terminals connected to the switching hub, and the switching hub manages to which VLAN a computer terminal of which user information belongs.

The description will continue assuming that the switching hub 1004 illustrated in FIG. 1 complies with the MAC based VLAN.

In FIG. 1, the PCs 1001 and 1002 and the image forming apparatus 1003 are connected to the switching hub 1004. The PC 1001 is connected to a port 1 of the switching hub, the PC 1002 is connected to a port 2, and the image forming apparatus 1003 is connected to a port 3.

The switching hub 1004 performs management in a manner that the PC 1002 belongs to the first VLAN (VLAN 1), and the PC 1001 and the image forming apparatus 1003 belong to the second VLAN (VLAN 2). In this case, the VLAN database illustrated in FIG. 6 is stored in a memory (not illustrated) of the switching hub 1004.

In FIG. 6, the PC 1001 having a MAC address of 000085000001 and the image forming apparatus 1003 having a MAC address of 00085000003 are managed as the VLAN 1 by the switching hub. The PC 1002 having a MAC address of 000085000002 is managed as the VLAN 2.

When the switching hub 1004 performs management as illustrated in FIG. 5, even if the PC 1002 designates the IP address of the PC 1001 to request data transmission or reception, the PCs 1002 and 1001 belong to different VLANs. Thus, no data is transmitted or received between the PCs 1002 and 1001.

Upon receiving a broadcast packet from the PC 1001, the switching hub 1004 transmits the broadcast packet to the image forming apparatus 1003, which belongs to the same VLAN (VLAN 2) as that of the PC 1001. On the other hand, the switching hub 1004 transmits no broadcast packet to the PC 1002, which belongs to a VLAN (VLAN 1) different from that of the PC 1001.

In FIG. 6, the PC 1001 having a MAC address of 000085000001 is in a VLAN nonparticipation state. However, the above description assumes that the PC 1001 is in a participation state.

In the VLAN database illustrated in FIG. 6, the VLAN participation state indicates whether a computer terminal identified by a MAC address participates in the VLAN. As described above, to enable participation of a certain computer terminal in the VLAN, simple establishment of a communication link with the switching hub 1004 is not enough. In the communication link established state, the switching hub 1004 has to receive a MAC address of the computer terminal.

It is presumed that the switching hub 1004 has received a MAC address of a computer terminal in a link-up state where a communication link with the computer terminal has been established. In this case, the switching hub 1004 performs management to switch a VLAN participation state corresponding to the MAC address from nonparticipation to participation.

An operation performed by the image forming apparatus 1003 connected to the switching hub 1004 compatible to the MAC based VLAN will be described.

Figure 7:
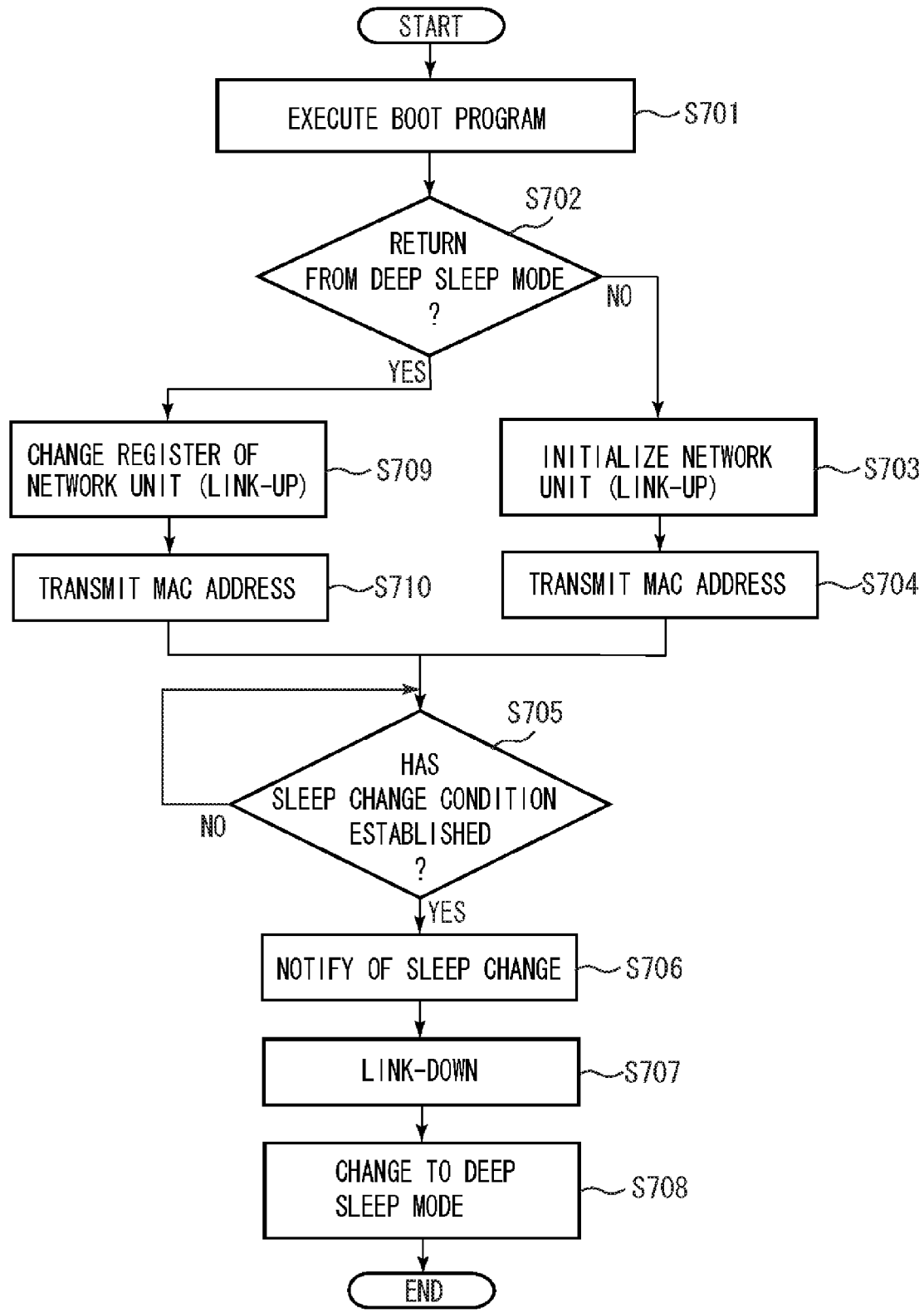
FIG. 7 is a flowchart illustrating an operation executed by a CPU of the control unit.
Figure 8:
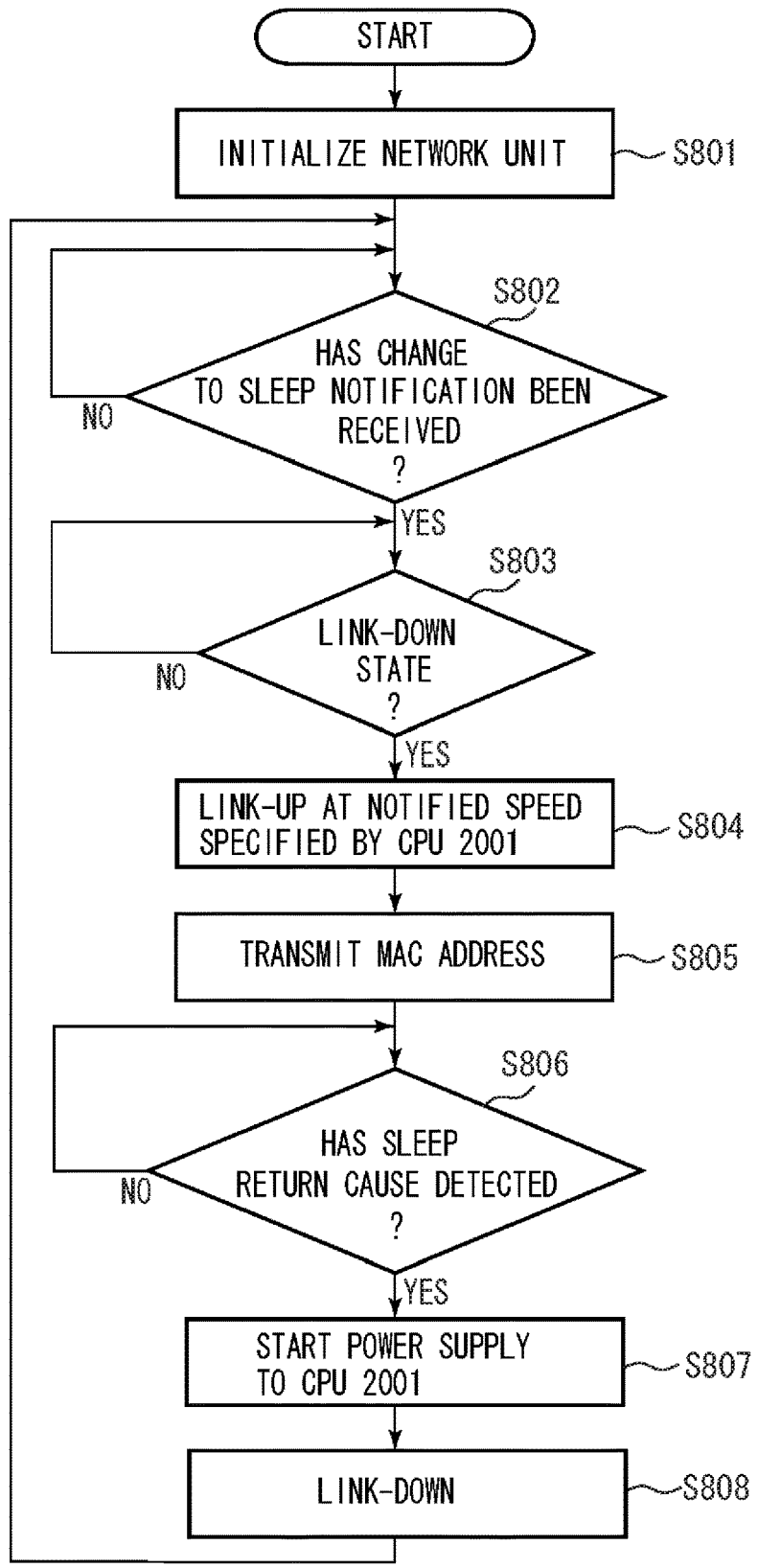
FIG. 8 is a flowchart illustrating an operation executed by a CPU of the network unit.

FIG. 7 is a flowchart illustrating an operation performed by the CPU 2001 of the control unit 1006. FIG. 8 is a flowchart illustrating an operation performed by the CPU 301 of the network unit 2008.

The operation of the flowchart of FIG. 7 is started by starting power supplying from the power supply unit 1009 to the CPU 2001.

There are following two cases for starting power supplying from the power supply unit 1009 to the CPU 2001. One is when a main switch (not illustrated) of the image forming apparatus 1003 is switched from OFF to ON. The other is when the operation mode of the image forming apparatus 1003 is switched from the deep sleep mode to the normal mode while the main switch of the image forming apparatus 1003 is the ON state.

In step S701, the CPU 2001 reads the boot program stored in the ROM 2002 to expand it on the RAN 2006, and executes the boot program expanded on the RAM 2006. The CPU 2001 reads, by executing the boot program, the OS 4000 and various control drivers 4001 to 4006 illustrated in FIG. 4 from the HDD 2002 to expand them on the RAM 2006. Then, the CPU 2001 operates the OS 4000 and the network unit control driver 4003 executed on the OS 4000 expanded on the RAM 2006 to execute each step.

In step S702, the OS 4000 determines whether the image forming apparatus 1003 has returned from the deep sleep mode to the normal mode, or whether the main switch has been switched from OFF to ON. The OS 4000 refers to flag information stored in the RAM 2006 to execute determination of step S702.

In step S707 described below, the OS 4000 stores information indicating a change to the deep sleep mode as flag information when changing to the deep sleep mode. The OS 4000 determines, if information indicating a change to the deep sleep mode has been stored as flag information, that the mode has returned from the deep sleep mode to the normal mode.

If the return to the deep sleep mode is determined (YES in step S702), the processing proceeds to step S709. Otherwise, the processing proceeds to step S703.

In step S703, the network unit control driver 4003 gives instruction to the network unit 2008 to initialize the network unit 2008. Specifically, the network unit control driver 4003 sets a register of the CPU 301 to cancel a reset signal to the CPU 301. To initialize the MAC/PHY 302, the network unit control driver 4003 sets a register of the MAC/PHY 302. Thereby, the network unit 2008 is initialized to be capable of communicating with the CPU 2001 and the switching hub 1004.

It is presumed that the MAC/PHY 302 of the network unit 2008 and the switching hub 1004 are both compatible to an auto-negotiation function. In the register of the MAC/PHY 302, whether the auto-negotiation function is turned ON/OFF can be set. It is presumed that in the register of the MAC/PHY 302, as default setting when the network unit 2008 is initialized, the auto-negotiation function is turned ON.

In this case, the MAC/PHY 302 transmits a pulse signal called a fast link pulse (FLP) to the switching hub 1004 in response to initialization of the network unit 2008. The FLP is transmitted from the switching hub 1004 to the MAC/PHY 302. The MAC/PHY 302 can recognize a communication speed to which the switching hub 1004 is compatible based on the FLP received from the switching hub 1004.

In the exemplary embodiment, the MAC/PHY 302 and the switching hub 1004 are both compatible to communication speeds of 10 Mbps, 100 Mbps, and 1000 Mbps. Thus, the MAC/PHY 302 determines 1000 Mbs that is a highest communicable speed for both as a communication speed to link up with the switching hub 1004. The linking-up means a communication link established state or a data transmission/reception enable state. Linking-down means a communication link non-established state or a data transmission/reception disable state. The communication link established state means a state where not only certain information can be transmitted/received but also packet data can be transmitted/received.

In step S704, the network unit control driver 4003 transmits a MAC address, which is a physical address allocated to the network unit 2003, to the switching hub 1004 via the network unit 2008.

In step S703, the CPU 2001 performs control to generate a packet containing a MAC address, and to transmit the generated packet to the switching hub 1004 via the MAC/PHY 302 of the network unit 2008. In step S704, the CPU 301 of the network unit 2008 is not involved in packet transmission.

Upon receiving the MAC address (000085000003) of the network unit 2003 from the image forming apparatus 103, the switching hub 1004 switches a VLAN participation state of the received MAC address from "non-participation" to "participation". The switching hub 1004 accordingly performs management assuming that a computer terminal corresponding to the received MAC address has participated in the VLAN.

In step S709, the network unit control driver 4003 gives an instruction to the network unit 2008 to change the register of the MAC/PHY 302 of the network unit 2008. Specifically, the setting to turn OFF the auto-negotiation function in the MAC/PHY 302 is changed to setting to turn it ON.

In this case, the MAC/PHY 302 transmits a pulse signal called a FLP to the switching hub 1004 according to turning-ON of the auto-negotiation function. The FLP is transmitted from the switching hub 1004 to the MAC/PHY 302. The MAC/PHY 302 can recognize that the switching hub 1004 is compatible to a communication speed based on the FLP received from the switching hub 1004.

In the exemplary embodiment, the MAC/PHY 302 and the switching hub 1004 can both be compatible to communication speeds of 10 Mbps, 100 Mbps, and 1000 Mbps. The MAC/PHY 302 accordingly determines 1000 Mbps, which is a highest compatible speed for both, as a communication speed to link up with the switching hub 1004.

In step S710, the network unit control driver 4003 transmits a MAC address, which is a physical address allocated to the network unit 2003, to the switching hub 1004 via the network unit 2008.

In step S703, the CPU 2001 performs control to generate a packet including a MAC address and to transmit the generated packet to the switching hub 1004 via the MAC/PHY 302 of the network unit 2008. In step S710, the CPU 301 of the network unit 2008 is not involved in packet transmission.

In step S705, the OS 4000 determines whether a sleep change condition (switching condition) has been established to switch the image forming apparatus 1003 to the deep sleep mode, and the processing proceeds to step S706 if established (YES in step S705).

If the sleep change condition is not established (NO in step S705), the OS 4000 executes step S705 again. In this case, the CPU 2001 that executes the OS 4000 functions as a first determination unit for determining whether the switching condition has been established.

The OS 4000 determines that the sleep change condition has been established, for example, if a state in which neither of the control drivers 4001 to 4006 is executed on the OS 4000 continues for a predetermine period (e.g., 15 minutes). For example, if a state where the network unit 2008 receives no packet and the operation unit 1010 is not operated continues for a predetermined period, the OS 4000 determines that the sleep change condition has been established.

In step S706, the network unit control driver 4003 notifies the CPU 301 of the network unit 2008 that the image forming apparatus 1003 is changed to the deep sleep mode. In this case, the network unit control driver 4003 notifies the CPU 301 of information indicating a speed of communication carried out between the network unit 2008 and the switching hub 1004 after the change to the deep sleep mode. Specifically, the network unit control driver 4003 notifies the CPU 301 of information indicating a communication speed of 10 Mbps.

In step S707, the network unit control driver 4003 changes a connection state between the MAC/PHY 302 and the switching hub 1004 from a link-up state where a communication link has been established to a link-down state where no communication link has been established. Specifically, the network unit control driver 4003 sets the register of the MAC/PHY 302 to a link-down state. After this register setting, the MAC/PHY 302 sets a communication state with the switching hub 1004 to a link-down state.

The switching hub 1004 periodically monitors a link state with the image forming apparatus 1003, and switches a VLAN participation state of a MAC address corresponding to the image forming apparatus 302 from "participation" to "nonparticipation" when the link-down state is detected. The switching hub 1004 accordingly recognizes a nonparticipation state of the image forming apparatus 1003 in the VLAN1 of the switching hub 1004.

The setting to turn ON the auto-negotiation function has been set in the MAC/PHY 302. Thus, the setting is changed to turn the function OFF. This change is made, in the deep sleep mode, to set a speed of communication carried out between the network unit 2008 and the switching hub 1004 lower than that in the normal mode.

In step S708, the CPU 2001 transmits a signal to the power OFF/ON unit 2016 via the power control signal line 2022 for cutting off power supplied via the power supply line 2020. The power OFF/ON unit 2016, which has received the signal, cuts off power supplied to the CPU 2001 via the power supply line 2020. Thus, the image forming apparatus 1003 changes to the deep sleep mode.

The operation of the image forming apparatus 1003 to change from the deep sleep mode to the normal mode is as described above.

Referring to FIG. 8, an operation performed by the CPU 301 of the network unit 2008 will be described below.

Changing the main switch (not illustrated) of the image forming apparatus 1003 from OFF to ON starts supplying power from the power supply unit 1009 to the CPU 301. An operation of a flowchart illustrated in FIG. 8 is started when the network unit control driver 4003 cancels a reset signal of the CPU 301.

In step S801, the CPU 301 reads a program from the ROM 302 to expand it in the RAM 305, and executes the program expanded in the RAM 305. Executing this program initializes the network unit 2008 to a communicable state with the CPU 2001 and the switching hub 1004.

After initialization of the network unit 2008, as described above, the MAC/PHY 302 determines 1000 Mbps, which is a highest communicable speed between the MAC/PHY 302 and the switching hub 1004, as a communication speed. The MAC/PHY 302 links up with the switching hub 1004 at the determined communication speed.

In step S802, the CPU 301 determines whether it has received a notification of a change to the deep sleep mode from the network unit control driver 4003 (CPU 2001), and the processing proceeds to step S803 if received (YES in step S802).

The CPU 301 receives from the CPU 2001 the notification of the change to the deep sleep mode together with information indicating a speed of communication (communication speed information) carried out between the network unit 2008 and the switching hub 1004 after the change to the deep sleep mode.

In step S803, the CPU 301 checks whether the network unit control driver 4003 (CPU 2001) has set the register of the MAC/PHY 302. The CPU 301 accordingly determines whether the MAC/PHY 302 has been set in a link-down state. The CPU 301 proceeds to step S804 if it determines that the MAC/PHY 302 has been set in the link-down state (YES in step S803). The register setting of the MAC/PHY 302 is changed by the CPU 2001 to turn OFF the auto-negotiation function.

In step S804, the CPU 301 switches a connection state between the MAC/PHY 302 and the switch HUB 1004 from the link-down state to a link-up state at a communication speed indicated by the communication speed information received from the CPU 2001 in step S802. The CPU 2001 (network unit control driver 4003) has designated 10 Mbps lower than a communication speed (1000 Mbps) in the normal mode to save power. Thus, the CPU 301 notifies the switching hub 1004 of linking-up at the communication speed of 10 Mbps. According to this notification, the MAC/PHY 302 and the switching hub 1004 are set in a linked-up state at the communication speed of 10 Mbps.

In step S805, the CPU 301 transmits a MAC address which is a physical address allocated to the network unit 2003 to the switching hub 1004 via the MAC/PHY 302. In step S804, the CPU 301 performs control to generate a packet containing a MAC address and to transmit the generated packet to the switching hub 1004 via the MAC/PHY 302.

In step S805, the CPU 2001 is not involved in packet transmission. The MAC address is information necessary when the switching hub 1004 causes the image forming apparatus 1003 to participate in the VLAN 1.

Upon receiving the MAC address (000085000003) of the network unit 2003 from the image forming apparatus 1003, the switching hub 1004 changes a VLAN participation state of the received MAC address from "nonparticipation" to "participation". The switching hub 1004 accordingly recognizes a participation state of a computer terminal (image forming apparatus 1003) corresponding to the received MAC address in the VLAN 1 of the switching hub 1004.

In step S806, the CPU 301 determines whether it has detected a sleep return cause (whether a return condition has been established). If the sleep return cause is detected (YES in step S806), the processing proceeds to step S807.

For example, the following two can be sleep return causes. One is a case where the MAC/PHY 302 has received a WOL pattern via the LAN 1005. The CPU 301 determines whether a packet received by the MAC/PHY 302 matches a WOL pattern stored in the ROM 304. If matched, the CPU 301 has detected a sleep return cause.

The other is a case where a LAN cable is inserted into/pulled out of a LAN socket of the network unit 2008. The CPU 301 determines whether the LAN cable has been inserted/pulled out, and has detected a sleep return cause if it determines that the LAN cable has been inserted/pulled out. In step S806, the CPU 301 functions as a second determination unit to determine whether a return condition has been established to return the image forming apparatus 1003 from the deep sleep mode as a power saving mode to the normal mode.

In step S807, the CPU 301 transmits a signal for turning ON the power supply line 2020 to the power ON/OFF unit 2016 via the control signal line 2023 to start supplying power to the CPU 2001.

In step S808, the CPU 301 sets the register of the MAC/PHY 302 to set a link-state between the MAC/PHY 302 and the switching hub 1004 to be a link-down state. After the setting of the register, the MAC/PHY 302 sets a communication state with the switching hub 1004 to a link-down state.

The switching hub 1004 periodically monitors its link state with the image forming apparatus 1003, and switches, when the link-down state is detected, a VLAN participation state of a MAC address corresponding to the image forming apparatus 1003 from "participation" to "nonparticipation". The switching hub 1004 accordingly recognizes a nonparticipation state of the image forming apparatus 1003 in the VLAN of the switching hub 1004.

As described above, the first exemplary embodiment enables secure transmission of information (MAC address) necessary for participation of the image forming apparatus 1003 in the virtual network (MAC address based dynamic VLAN) to the switching hub while saving power of the image forming apparatus 1003 as a communication apparatus. Thus, the image forming apparatus 1003 can participate in the dynamic VLAN while keeping its power consumption low in the deep sleep mode which is a power saving mode.

Average power consumed in the operated state of the CPU 2001 is higher than that consumed in the operated state of the CPU 301. The CPU 2001 notifies, during a change to the power saving mode, the network unit 2008 of a change to the sleep mode and a communication speed, but it is not involved in MAC address transmission. Thus, as compared with a case where the CPU 2001 is involved in MAC address transmission, power saving can be achieved since power supplied to the CPU 2001 is cut off promptly.

In the above description, the switching hub 1004 is compatible to the MAC base VLAN which is a dynamic VLAN. However, other arrangements may be employed.

For example, the switching hub 1004 may be compatible to a subnet based VLAN, which is a dynamic VLAN. In this case, the switching hub 1004 stores a database similar to that illustrated in FIG. 10 as a VLAN database in the RAM 902. The image forming apparatus 1003 establishes a communication link with the switching hub 1004 to set a link-up state, and then transmits an IP address allocated thereto to participate in the VLAN 1 to the switching hub 1004.

After the communication link with the image forming apparatus 1003 has been established to be the link-up state, the switching hub 1004 receives an IP address (192.168.12.1) of the image forming apparatus 1003. In this case, the switching hub 1004 performs management as the image forming apparatus 1003 has participated in the VLAN 1.

For example, the switching hub 1004 may be compatible to a user based VLAN, which is a dynamic VLAN. In this case, the switching hub 1004 stores a database similar to that illustrated in FIG. 11 as a VLAN database in the RAM 902. The image forming apparatus 1003 establishes a communication link with the switching hub 1004 to be a link-up state.

Then, the image forming apparatus 1003 transmits a user ID (user information) to identify a user logging-in the image forming apparatus 1003 to participate in the VLAN 1 to the switching hub 1004. After having been set in the linked-up state by establishing the communication link with the image forming apparatus 1003, the switching hub 1004 receives the user ID (USER-C) from the image forming apparatus 1003. In this case, the switching hub 1004 performs management as the image forming apparatus 1003 has participated in the VLAN 1.

In the above description, the switching hub 1004 is compatible to the dynamic VLAN (e.g., MAC based VLAN). However, other arrangements may be employed. For example, a switching hub 1004 that is not compatible to a dynamic VLAN may be used.

Then, the image forming apparatus 1003 obtains, from the switching hub 1004, information indicating whether the switching hub 1004 is compatible to a dynamic VLAN. Based on the obtained information, the image forming apparatus 1003 determines whether the switching hub 1004 is compatible to a dynamic VLAN. If the image forming apparatus 1003 determines that the switching hub 1004 is not compatible to the dynamic VLAN, the CPU 2001 does not execute steps S704 and S710. The CPU 301 does not execute step S805. Thus, the processing can be appropriately carried out depending on whether the switching hub 1004 is compatible to the dynamic VLAN.

The present invention can be achieved by supplying a storage medium storing software program codes for realizing the functions of the exemplary embodiment to a system or an apparatus. In this case, a computer of the system or the apparatus reads and executes the program codes stored in the storage medium to realize the functions of the exemplary embodiment. In this case, the program codes read from the storage medium realize the functions of the exemplary embodiment themselves, and the storage medium storing the program codes is within the invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A communication apparatus comprising:
 a network interface configured to communicate with an external apparatus at any one of a plurality of communication speeds;
 a first control unit configured to process data received via the network interface from the external apparatus, and to change the communication speed of the network interface into a low communication speed among the plurality of communication speeds in a case where there is an input of an instruction for switching the communication apparatus to a power saving mode; and
 a second control unit configured to control the network interface so as to transmit identification information of the communication apparatus to the external apparatus in a case of a change in the communication speed of the network interface into the low communication speed by the first control unit,
 wherein power supply to at least the first control unit is cut off in the power saving mode, and
 wherein the second control unit processes the data received via the network interface in place of the first control unit after switching to the power saving mode.

2. The communication apparatus according to claim 1, wherein the external apparatus is a switching hub.

3. The communication apparatus according to claim 1, wherein the plurality of communication speeds is compliant with Ethernet (registered trademark) standard.

4. The communication apparatus according to claim 1, further comprising:
   a printing unit configured to print the data processed by the first control unit;
   wherein power supply to at least the printing unit is cut off in the power saving mode.

5. The communication apparatus according to claim 1, wherein the identification information is a MAC (Media Access Control) address.

6. The communication apparatus according to claim 1, wherein the identification information is an IP (Internet Protocol) address.

\* \* \* \* \*